(12) United States Patent
Johnson

(10) Patent No.: US 7,207,237 B2
(45) Date of Patent: Apr. 24, 2007

(54) DUAL CLAMP BICYCLE STEM FACE PLATE

(75) Inventor: Lance E. Johnson, Santa Barbara, CA (US)

(73) Assignee: XYZ Aero, Inc., Sterling, IL (US)

( * ) Notice: Subject to any disclaimer, the term of this patent is extended or adjusted under 35 U.S.C. 154(b) by 0 days.

(21) Appl. No.: 10/864,995

(22) Filed: Jun. 10, 2004

(65) Prior Publication Data
US 2005/0000313 A1   Jan. 6, 2005

Related U.S. Application Data

(60) Provisional application No. 60/478,473, filed on Jun. 12, 2003.

(51) Int. Cl.
*B62K 21/12* (2006.01)
(52) U.S. Cl. .................. 74/551.8; 74/551.1
(58) Field of Classification Search .......... 74/551.1, 74/551.8; 403/389, 396, 177, 178, 237, 309; B62K 21/12
See application file for complete search history.

(56) References Cited

U.S. PATENT DOCUMENTS

| 5,163,339 | A | * | 11/1992 | Giard et al. ............... 74/551.3 |
| 5,429,013 | A | * | 7/1995 | Taylor et al. ............... 74/551.1 |
| 5,509,328 | A | * | 4/1996 | Lai ............... 74/551.3 |
| 5,568,958 | A | * | 10/1996 | Chen ............... 297/215.15 |
| 5,881,606 | A | * | 3/1999 | Roddy ............... 74/551.3 |
| 6,467,372 | B2 | * | 10/2002 | Klieber ............... 74/551.1 |
| D483,306 | S | * | 12/2003 | Meinhold ............... D12/178 |
| 6,662,680 | B2 | * | 12/2003 | Rocket ............... 74/551.3 |
| 7,131,350 | B2 | * | 11/2006 | McColligan ............... 74/551.1 |
| 2003/0084746 | A1 | * | 5/2003 | Cutsforth ............... 74/551.8 |
| 2004/0112168 | A1 | * | 6/2004 | Alley ............... 74/551.8 |
| 2005/0044981 | A1 | * | 3/2005 | Huang ............... 74/551.8 |
| 2005/0166704 | A1 | * | 8/2005 | Huang ............... 74/551.8 |
| 2005/0268743 | A1 | * | 12/2005 | Meng ............... 74/551.8 |

FOREIGN PATENT DOCUMENTS

DE            42 24 374 A1  *   1/1993

* cited by examiner

*Primary Examiner*—Vinh T. Luong
(74) *Attorney, Agent, or Firm*—Banner & Witcoff, Lltd.

(57) ABSTRACT

A dual clamp bicycle stem face plate assembly for use in combination with a bicycle steering system includes a dual clamp face plate member attachable to the outside end of the extension arm of a bicycle steering assembly and which further includes an auxiliary or second clamp for retaining and gripping a second handle bar or pair of handles.

4 Claims, 4 Drawing Sheets

DUAL CLAMP BICYCLE STEM FACE PLATE

CROSS REFERENCE TO RELATED APPLICATION

This is a utility application based on Ser. No. 60/478,473 entitled "Dual Clamp Bicycle Stem Face Plate" filed Jun. 12, 2003 which is incorporated herewith by reference and for which priority is claimed.

BACKGROUND OF THE INVENTION

In a principal aspect, the present invention relates to an assembly used in combination with the steering system of a bicycle which enables utilization of at least two handle bars for the steering system.

Biking enthusiasts seek to incorporate into their bicycles the most recent technology which will enable them to enjoy their bicycle for recreational as well as sporting purposes. Among the features which biking enthusiasts may employ or desire are handle bar constructions which facilitate steering of the bicycle comfortably and efficiently. Often bicyclists find that a certain handle bar construction is beneficial with respect to certain terrain conditions whereas an alternative handle bar construction is desirable in alternative situations. Alternative weather, environmental or terrain situations may thus require alternative handle bar arrangements when using the bike in order to improve comfort, avoid fatigue or to improve streamlining in the event of sport biking.

Thus, there has developed a need for a means to incorporate alternative handle bar assemblies or handle bars in sporting bikes, racing bikes and the like. The present invention is directed to such an objective and further to the objective of enabling biking enthusiasts to incorporate multiple handle bar constructions on a single bicycle in a simplified and efficient manner while avoiding the addition of significant weight and avoiding other encumbrances to the use of the bicycle. Of course, the technology may apply to bicycles having two or more wheels.

SUMMARY OF THE INVENTION

Briefly, the present invention comprises a dual clamp bicycle stem face plate assembly for use in combination with a bicycle steering system. Typically, a bicycle steering system includes a generally vertical steering tube associated with the front wheel of the bicycle and mounted so as to rotate about its axis in a manner which will enable directional movement of the front wheel. The top of the steering tube typically includes a steering arm extension which may be manipulated by turning handle bars attached to the steering arm extension. The steering arm extension in combination with the handle bars thus provides a mechanical advantage which enables operation of the steering tube by rotation thereof in a highly efficient manner.

The invention contemplates a steering arm extension which includes a dual clamp bicycle stem face plate assembly attached thereto. The face plate assembly incorporates a bracket extension which attaches to the steering arm extension and which, in combination therewith, enables attachment of a first set of handle bars. The bracket extension further includes an outer end or a secondary clamp section which in combination with a fastening element enables the attachment of a second handle bar or handle bars. In a preferred embodiment, the first and second handle bars are arranged so that they include parallel crossbar elements retained in alignment by the face plate assembly of the invention. The separate handle bar constructions may thus include unique arrangements of the handles to enable the user of the bike to engage in alternative positions for gripping and holding and steering the bicycle.

Various alternative arrangements of the face plate assembly are disclosed, each one being directed to the means for attaching the first and second handle bars to the steering arm extension associated with the steering tube of the bicycle. The handle bars, of course, may be single bar constructions or two part handle bar constructions. For example, the second handle bar may comprise a right hand and a left hand handle and cross bar elements. The invention contemplates a stem face plate assembly which will accommodate such a construction.

Therefore, it is an object of the invention to provide an improved stem face plate assembly for use in combination with a bicycle steering system to enable incorporation of at least two sets of handle bars for use with the steering system.

It is a further object of the invention to provide mechanically straight forward, yet highly efficient face plate assembly that can be adopted to attach first and second handle bars to the steering mechanism of a bicycle.

Yet another object of the invention is to provide a face plate assembly for use in combination with a bicycle which can be utilized in combination with preexisting steering assemblies for bicycles without significant modification or altering of the steering assembly.

Another object of the invention is to provide a mechanically efficient, highly reliable and reasonably priced stem face plate assembly for incorporation of two handle bar units in combination with a steering assembly for a bicycle.

These and other objects, advantages and features of the invention will be set forth in the detailed description which follows.

BRIEF DESCRIPTION OF THE DRAWING

In the detailed description which follows, reference will be made to the drawings comprised of the following figures.

DESCRIPTION OF THE PREFERRED EMBODIMENT

Figure 1:
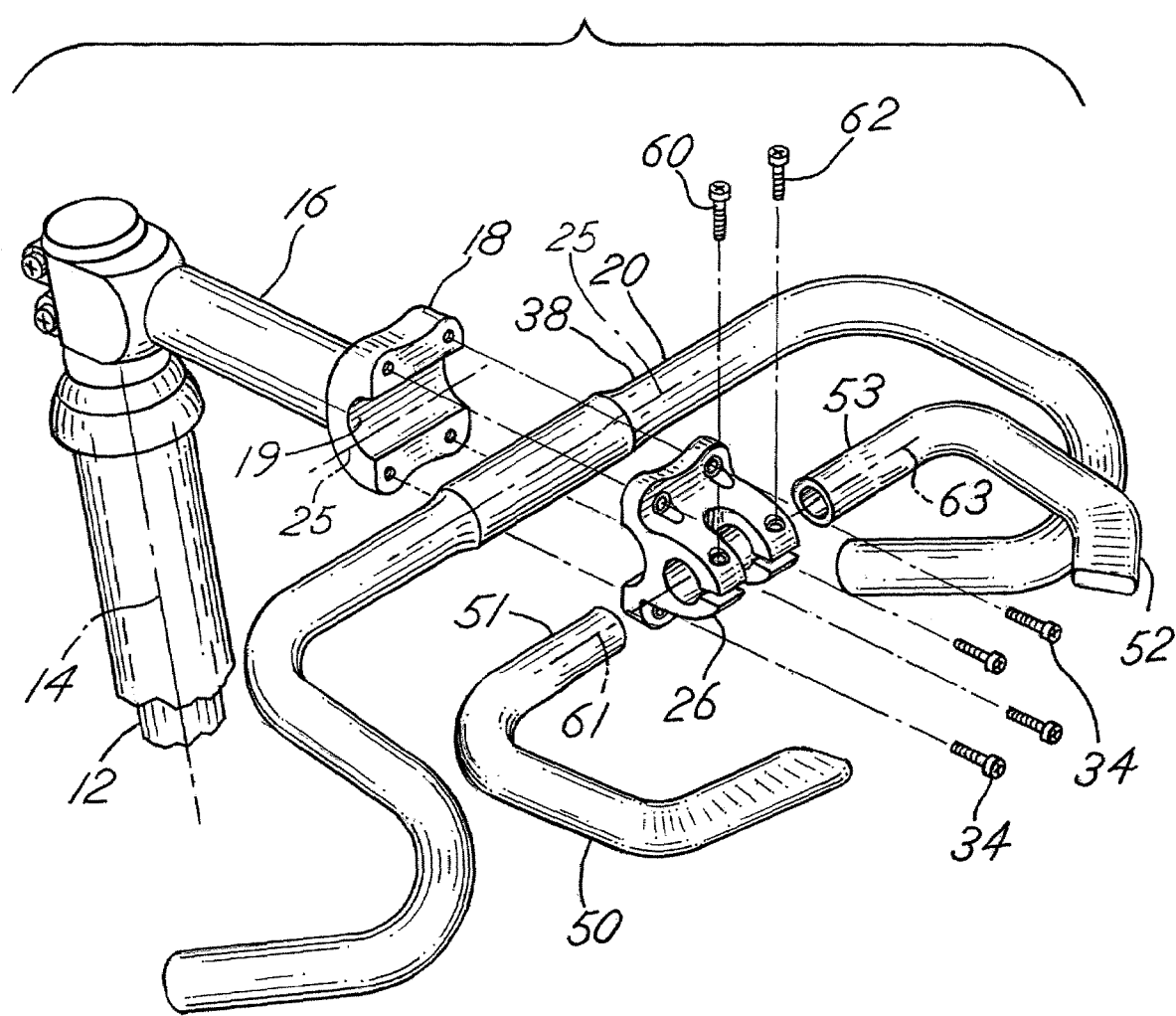
FIG. 1 is an exploded isometric view of a first embodiment of the invention.

Referring to the figures and in particular FIGS. 1–5, there is illustrated a first embodiment of the invention. The invention is incorporated in a bicycle wherein the front wheel of the bicycle 10 may be turned in response to a rotation of a journaled steering tube 12 about its axis of rotation 14. Rotation of the steering tube 12 in an appropriate bearing housing or housing (not shown) may be effected by manipulating an arm extension or stem extension 16. The stem extension 16 includes an outside or distal end 18 to which a primary or first handle bar 20 may be affixed. As depicted in prior art FIG. 9, extension 16 may have attached thereto a handle bar 20 by means of a primary clamp 21 attached by fasteners 23 to the outer end 18 of the extension 16 having a first arcuate recess 19 in FIG. 1. The handle bar 20 may then be pivoted or rotated about an axis 25 and retained in a desired rotational position by tightening of the fasteners 23 so as to engage the clamp 21 tightly against the handle bar 20.

Figure 9:
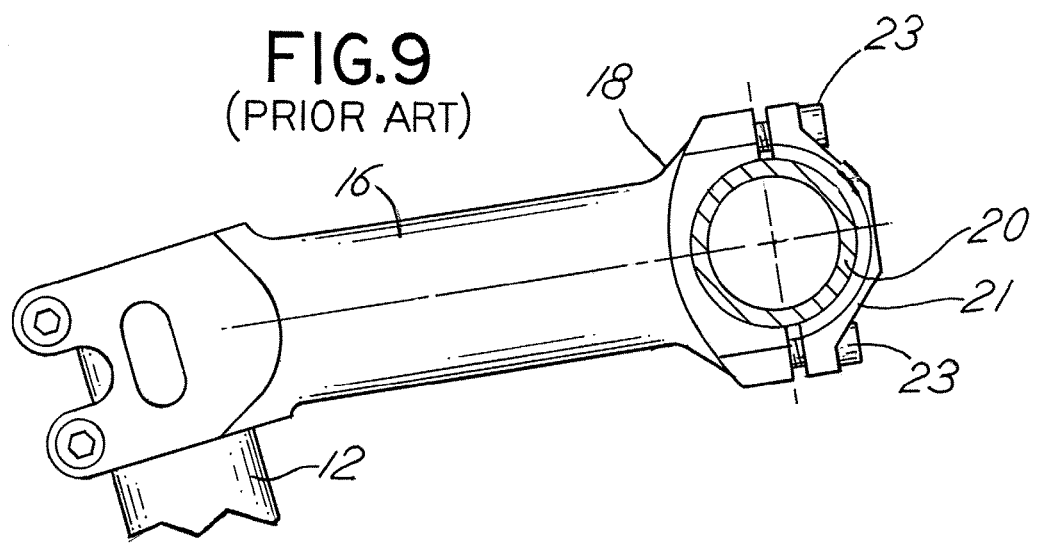
FIG. 9 is a side view of a traditional prior art bicycle stem assembly.

The present invention contemplates removal of the plate or primary clamp 21 of FIG. 9 and replacement thereof with a specially constructed clamp face plate member 26. In the embodiment of FIGS. 1–5 the clamp face plate member 26 includes an arcuate recess 28 for fitting against a first handle bar 20. Oppositely projecting arms or tabs 30 and 32 are designed to cooperate with fasteners 34 and 36 so as to enable attachment of the claim face plate member 26 to the outside end 18 of the stem extension or arm extension 16, to thereby retain, between the arcuate face 28 and an arcuate face 19 of the arm extension 16 a first handle bar 20. It is to be noted that the first handle bar 20 includes a center element or cross bar element 38 which is generally transverse to the stem extension or arm extension 16. The cross bar element 38 defines an axis of rotation 25 when assembled.

Figure 2:
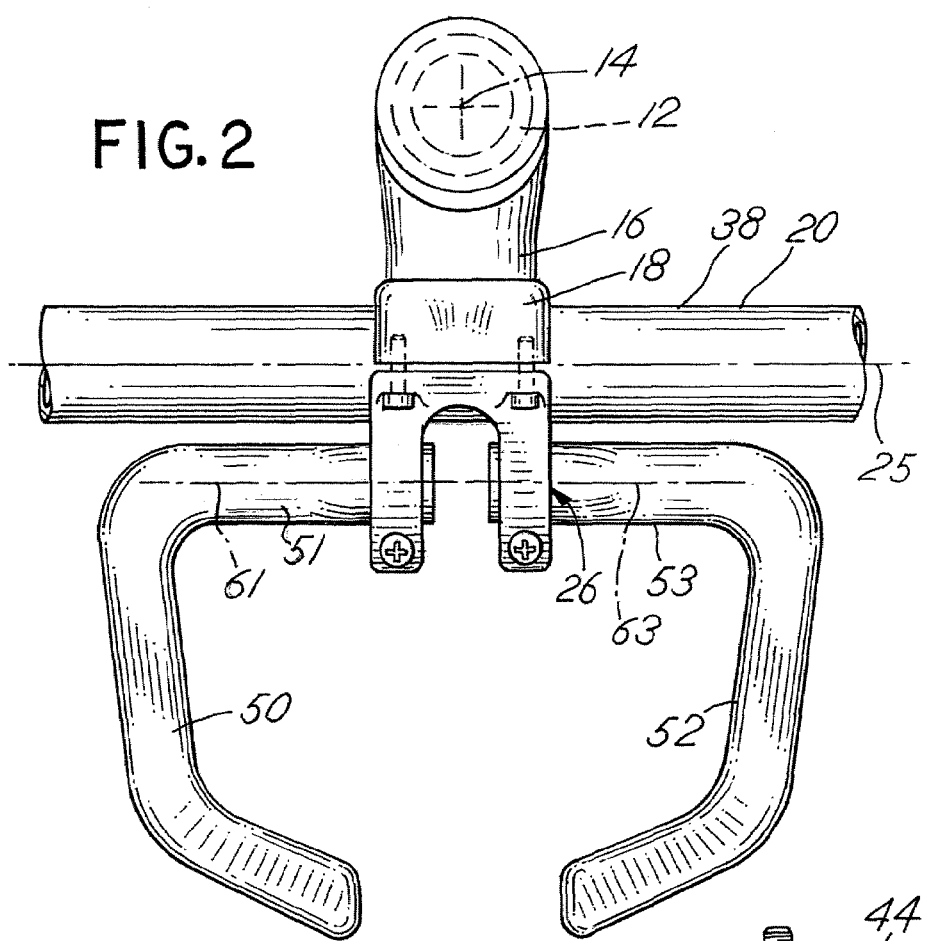
FIG. 2 is a top plan view of the embodiment of FIG. 1.
Figure 3:
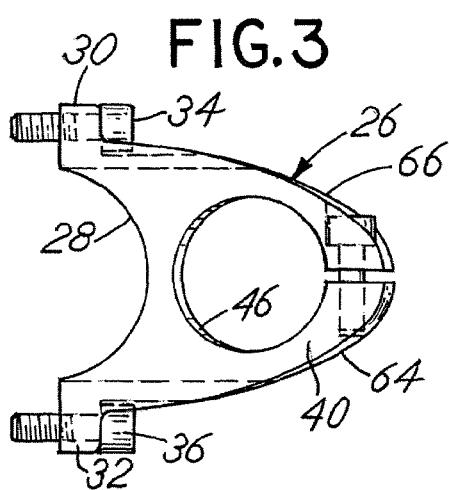
FIG. 3 is a side view of an element of the assembly associated with the embodiment of FIG. 2.
Figure 5:
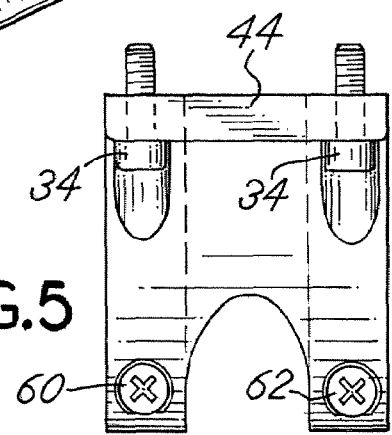
FIG. 5 is a top plan view of the element depicted in FIG. 3.
Figure 4:
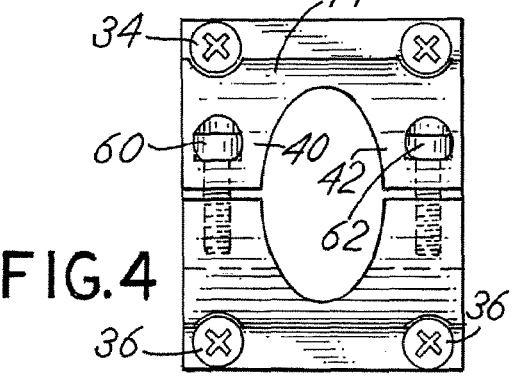
FIG. 4 is a top plan view of the element depicted in FIG. 3.

In the embodiment of FIGS. 1–5 the clamp face plate member 26 further includes first and second spaced and generally parallel bracket extension arms 40 and 42 comprising a secondary clamp section which are spaced from one another and connected together by a primary clamp section or plate member 44. Each of the bracket extension arms 40 and 42 define a generally circular aperture or opening 46 adapted to receive a secondary or second handle bar 50 such as depicted in FIG. 2 and a third handle bar 52, respectively, again as depicted in FIG. 2. The clamp face plate members 40 and 42 include a fastening element which in the embodiment of FIGS. 1–5 comprises a bolt fastener 60 and 62, respectively, which tighten the opposite opposed jaws 64 and 66 of the clamp face plate members 40, 42 so as to retain the second or third handle bars 50 and 52. Note that each of the second and third handle bars 50 and 52 include a cross bar element 51 and 53, respectively, which define an axis 61 and 63, respectively. The axes 61 and 63 are coincident axes and are generally parallel to the axis 25 associated with the first cross bar element 38; namely, axis 25. The clamp face plate members 40 and 42 may be constructed so as to provide for offset of the axes 61 and 63. The axes 61, 62 may be offset vertically, horizontally angled with respect to each other, or some combination thereof. Additionally, the utilization of independent clamp face plate members 40 and 42 enables independent adjustment of the second and third handle bars 50 and 52. Thus, the handle bars 50 and 52 may be rotated independently about their respective axes 61 and 63.

Figure 6:
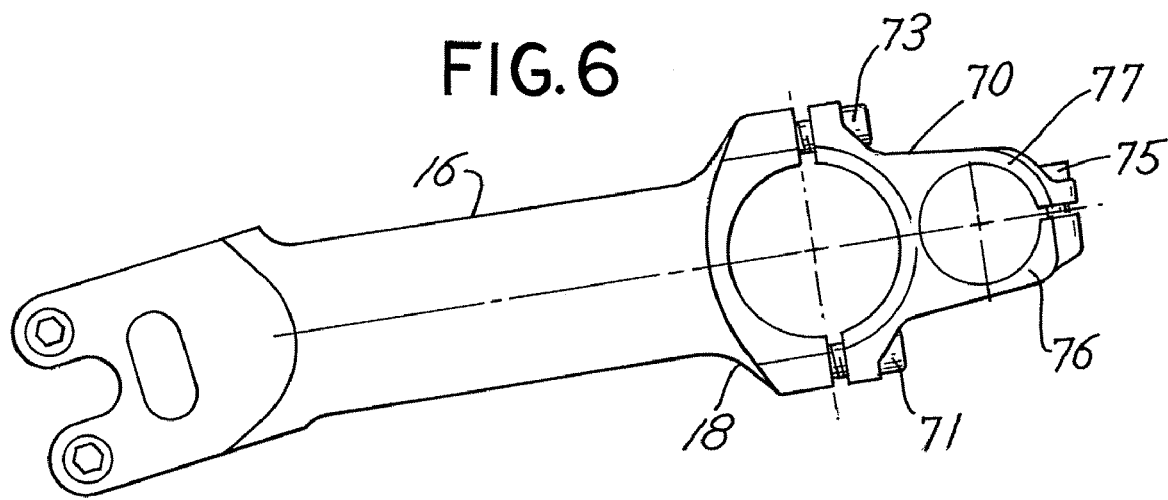
FIG. 6 illustrates an alternative construction of the invention.

The entire assembly may be attached to the arm extension 16 so that, as depicted in FIG. 1, the bicycle steering mechanism will include first, second and third handle bars 20, 50, 52. The construction of FIGS. 1–5 exemplifies the invention in as much as first, second and third handle bars 20, 50, 52 are attached to a single arm extension 16 with the handle bars 20, 50, 52 being independently adjustable and one set of handle bars 50, 52 being set in front of the other handle bar 20 and not attached one to the other. Various alternative constructions are illustrated by the additional figures. For example, in FIG. 6 there is illustrated an arm extension 16 with a clamp face plate member 70 attached to the end 18 of the arm extension 16 by means of fasteners 71 and 73. The clamp face plate member 70 includes or defines a secondary clamp which enables attachment of a second handle bar to the extension 70. A single fastener 75 is used to compress a closed arm 76 and 77 of the bracket extension.

Figure 7:
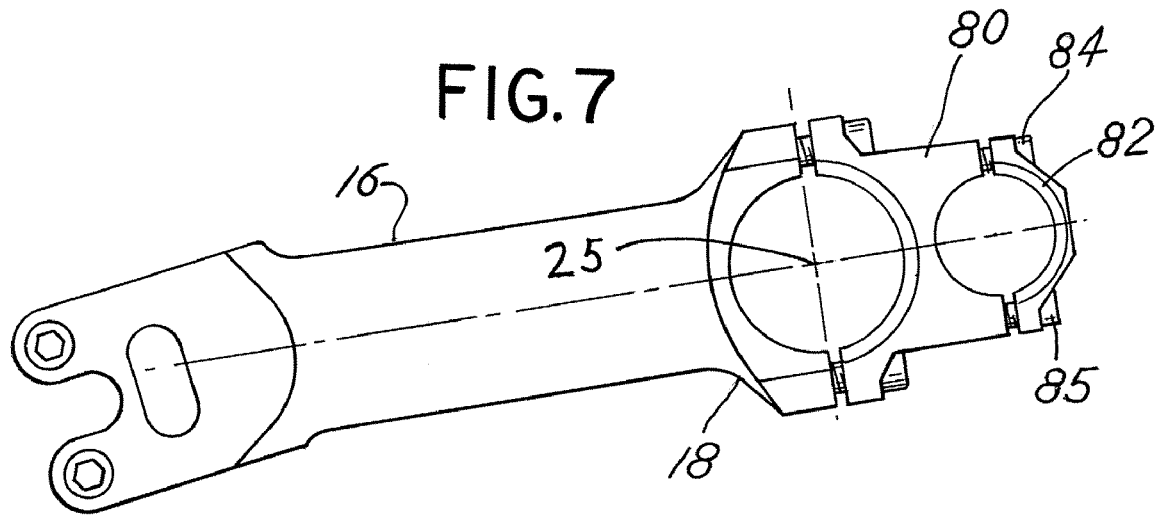
FIG. 7 is a side elevation of another alternative embodiment of the invention

FIG. 7 illustrates another alternative embodiment wherein a bracket extension 80 cooperates with a separate or separable secondary face plate or fastening element 82 attached by means of fasteners 84 and 85 to engage and hold a second handle bar.

Figure 8:
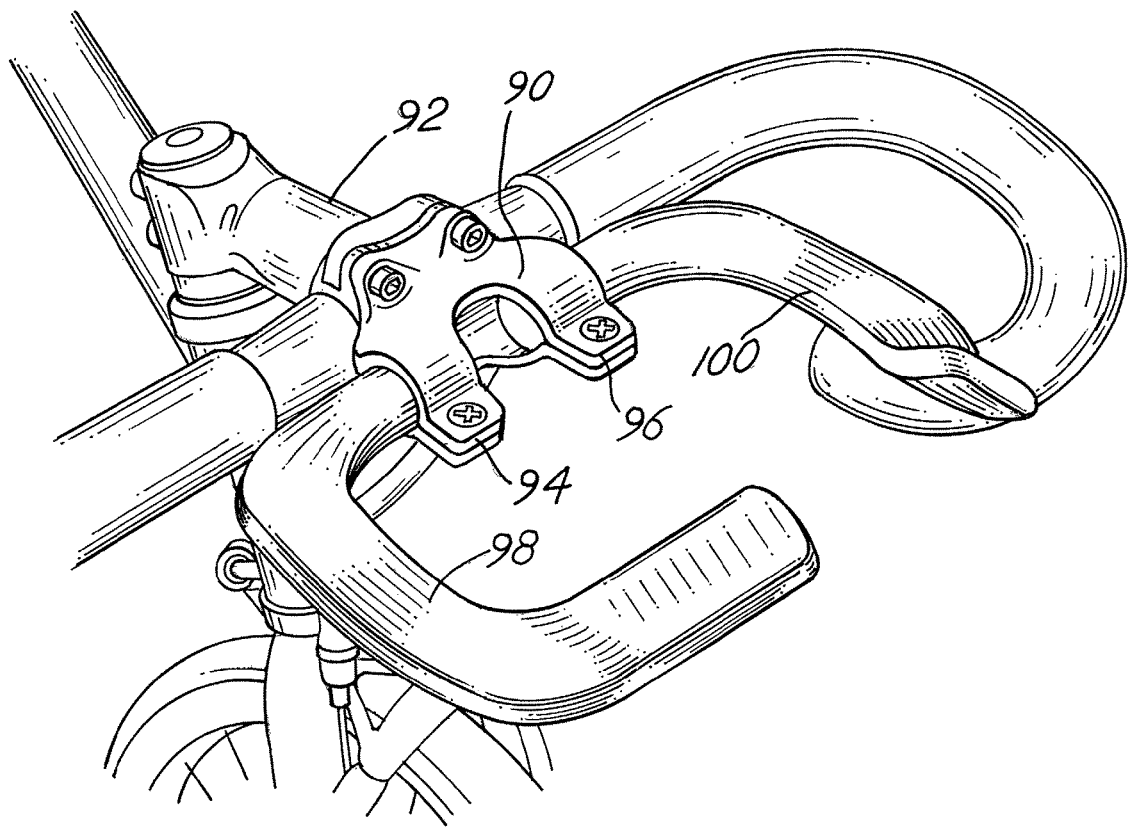
FIG. 8 is an isometric view of an additional or other alternative embodiment of the invention.

FIG. 8 illustrates yet another embodiment wherein the clamp face plate member 90 is attached to an arm extension 92. The clamp face plate member 90 includes spaced or bifurcated sets of arms 94 and 96 which independently grip separate second handle bars 98 and 100, respectively.

While there have been set forth preferred embodiments of the invention, it is to be understood that the invention is limited only by the following claims and equivalents thereof.

What is claimed is:

1. A dual clamp, bicycle stem, face plate assembly comprising in combination:

a bicycle steering arm extension, said steering arm extension including an outside end:

a first clamp face plate member having a primary clamp section, said first face plate primary clamp section capable of attachment to the said steering arm extension outside end to engage and retain a first handle bar cross bar element having a first transverse axis by clamping said first handle bar cross bar element to the steering arm extension, said face plate clamp member further including a secondary clamp section for clamping a second handle bar with a second handle bar cross bar element, said secondary clamp section clamping said second handle bar cross bar element substantially parallel to said first transverse axis, said second handle bar cross bar element spaced forwardly from the first cross bar element, said first handle bar element and said second handle bar element maintained generally parallel to each other; said first clamp face plate member includes a first recess for clamping the first handle bar cross bar element to said steering arm extension, and said first clamp face plate member further includes an extension arm with an end having a second recess for clamping said second handle bar cross bar element.

2. A dual clamp, bicycle stem, face plate assembly comprising in combination:

a bicycle steering arm extension, said steering arm extension including an outside end:

a first clamp face plate member having a primary clamp section, said first face plate primary clamp section capable of attachment to the said steering arm extension outside end to engage and retain a first handle bar cross bar element having a first transverse axis by clamping said first handle bar cross bar element to the steering arm extension, said face plate clamp member further including a secondary clamp section for clamping a second handle bar with a second handle bar cross bar element, said secondary clamp section clamping said second handle bar cross bar element substantially parallel to said first transverse axis, said second handle bar cross bar element spaced forwardly from the first cross bar element, said first handle bar element and said second handle bar element maintained generally parallel to each other; a third handle bar with a third handle bar cross bar element, and wherein said first clamp face plate member includes a third clamp section for clamping said third handle bar cross bar element substantially parallel to said first and said second cross bar elements.

3. The assembly of claim 2 wherein the second cross bar element and third cross bar element are substantially coaxial.

4. A dual clamp, bicycle stem, face plate assembly comprising in combination:
   a bicycle steering arm extension, said steering arm extension including an outside end:
   a first clamp face plate member having a primary clamp section, said first face plate primary clamp section capable of attachment to the said steering arm extension outside end to engage and retain a first handle bar cross bar element having a first transverse axis by clamping said first handle bar cross bar element to the steering arm extension, said face plate clamp member further including a secondary clamp section for clamping a second handle bar with a second handle bar cross bar element, said secondary clamp section clamping said second handle bar cross bar element substantially parallel to said first transverse axis, said second handle bar cross bar element spaced forwardly from the first cross bar element, said first handle bar element and said second handle bar element maintained generally parallel to each other; said outside end of said steering arm extension includes a first arcuate recess for receipt of said first handle bar cross bar element; and
   said first clamp face plate member primary clamp section includes an arcuate recess for receipt of said first handle bar cross bar element and fasteners for attaching the first clamp face plate member to the steering arm extension; and
   said first clamp face plate member secondary clamp section includes a first extension arm and a second extension arm, said first and second extension arms each forming a generally circular passage, said passages being generally coaxial, one of said passages for receipt of said second handle bar cross bar element, and
   fasteners for retaining a second handle bar cross bar element in said passages.

* * * * *